United States Patent [19]

Sonntag

[11] Patent Number: 4,858,583
[45] Date of Patent: Aug. 22, 1989

[54] ARRANGEMENT FOR THE METERING OF FUEL AND METERING DEVICE THEREFOR

[75] Inventor: Bruno Sonntag, Horstmar, Fed. Rep. of Germany

[73] Assignee: Hi-Tec-Gas International GmbH, Fed. Rep. of Germany

[21] Appl. No.: 150,666
[22] PCT Filed: Apr. 15, 1987
[86] PCT No.: PCT/EP87/00201
§ 371 Date: Dec. 14, 1987
§ 102(e) Date: Dec. 14, 1987
[87] PCT Pub. No.: WO87/06302
PCT Pub. Date: Oct. 22, 1987

[30] Foreign Application Priority Data

Apr. 17, 1986 [DE] Fed. Rep. of Germany ....... 3612994

[51] Int. Cl.$^4$ ............................................. F02B 43/00
[52] U.S. Cl. .................. 123/527; 123/27 GE
[58] Field of Search ................ 123/27 GE, 527

[56] References Cited

U.S. PATENT DOCUMENTS 2,696,714 12/1954 Hughes .............................. 123/527
3,176,709 4/1965 Jones .................................. 123/527
3,960,126 6/1976 Shinoda ............................. 123/527
4,141,326 2/1979 Wolber ......................... 123/DIG. 12
4,386,594 6/1983 Szloboda ....................... 123/27 GE
4,413,607 11/1983 Batchelor et al. ................. 123/527
4,617,904 10/1986 Pagdin ............................... 123/527

Primary Examiner—E. Rollins Cross
Attorney, Agent, or Firm—Chilton, Alix & Van Kirk

[57] ABSTRACT

Arrangement for the metering of fuel, in particular liquid gas, to a variable-output consumer, which comprises a metering device with a reduction valve (4), a metering valve (11) and a chamber (20, 21) arranged therebetween, as well as means of control or regulation for the setting of the valves as a function of operating variables, in particular for controlling the metering valve (11) as a function of a power requirement signal. For the purpose of high precision metering which is suitable even for the requirements of a lambda control, the arrangement is made such that the means of regulation act on the setting of the reduction valve (4), the chambers (20, 21) between the two valves being designed as a buffer volume for the equalization of pressure fluctuations. A metering device for this arrangement is characterized for the purposes of variable use by two separate housing parts, one of which, as chamber housing part (30), forms the buffer volume or is essential for heat transmission, while the other, as mechanics housing part (29), accommodates the reduction valve (4) and its actuation mechanism.

19 Claims, 2 Drawing Sheets

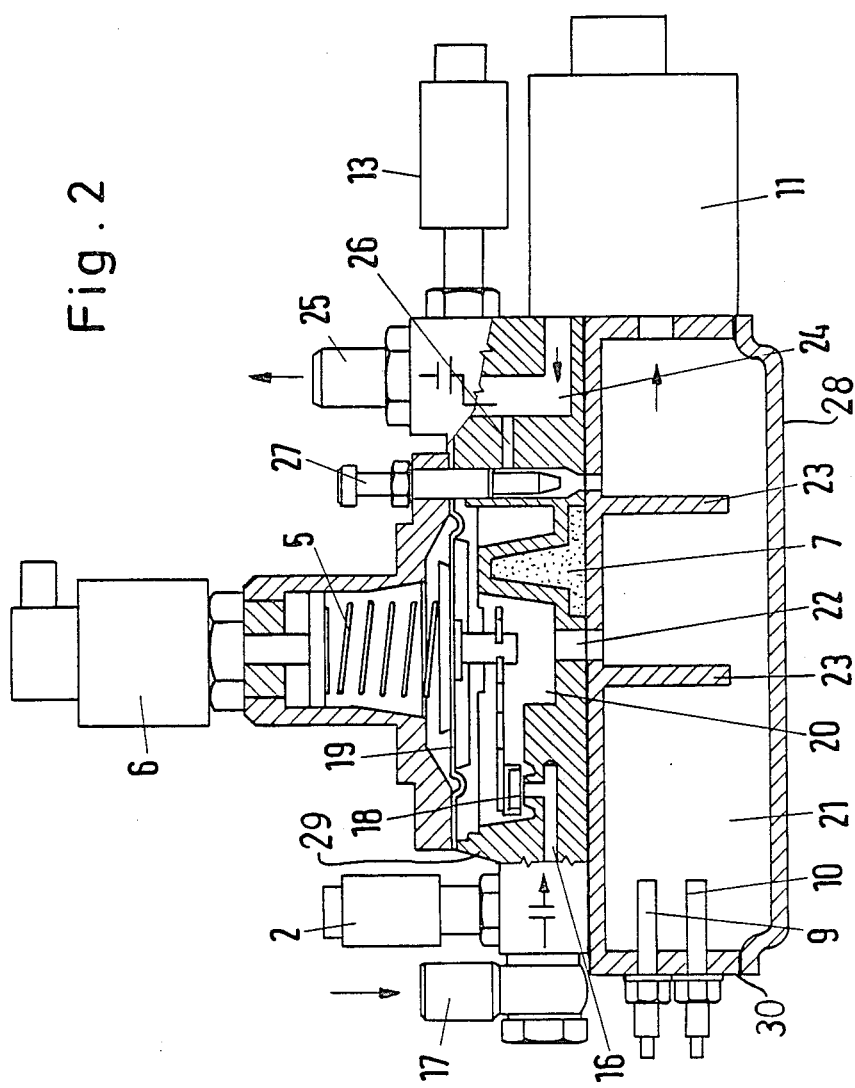

ARRANGEMENT FOR THE METERING OF FUEL AND METERING DEVICE THEREFOR

The invention relates to an arrangement for the metering of fuel, in particular liquid gas, to a variable-output consumer, for example a vehicle engine, which comprises a metering device with a reduction valve, a metering valve and a chamber arranged therebetween and means of control (open-loop system) or means of regulation (closed-loop system) for setting the valves as a function of operating variables, in particular for controlling the metering valve as a function of a power requirement signal.

Known arrangements of this type (WO 82/02926, EP-A 64373, EP-A 155538, DE-A 31 49 839, US-A 4,386,594) control the second valve as metering valve as a function of a power requirement signal, for example the pressure in the air duct leading to the consumer and, if appropriate, other operating variables such as engine speed, air and gas temperature. Control in this case is understood as meaning influencing the position of the metering valve in an open-loop system (in contrast to the closed-loop system). Open-loop control has the advantage that it can react virtually without delay to changes in the power requirement signal. It is set up in such a way, taking into account the positioning data of the valve, that the rate of fuel fed to the combustion air stream comes as close as possible to the desired ratio. A precondition here for the desired metering is that the pressure by which the gaseous fuel is fed to the metering valve has a predetermined magnitude which is either held constant or is controlled variably as a function of operating variables, in particular a power requirement signal. However, open-loop controls (unlike closed-loop controls) suffer from the basic disadvantage that, even with the most elaborate account taken of many operating variables, the accuracy of their effect is dependent on the functional constancy of the individual elements of the open-loop system. If, for example, the flow cross-section of a metering valve changes due to soiling or a control signal does not have the intended level owing to a fluctuating voltage supply, or if the metering valve operates in ranges with different characteristic curves due to changing operating conditions, this results in a metering error. Owing to this characteristic, the known arrangements are basically unsuitable for applications in which high-precision metering is demanded, for example for use in conjunction with a controlled catalyzer. It is admittedly known to use closed-loop control systems in engines with fuel injection, directly influencing the metering of the fuel. However, transferring this measure to gas metering has so far not yet proven possible, because it is extremely difficult to meter gases precisely under the effect of highly fluctuating operating influences and different characteristics of the gas itself under extreme load conditions. This also applies to cases where a high precision design is used for the metering valve and the operating variables are electronically processed, because the superposing of different operating conditions on the control of the metering valve results in a shift from its characteristic curve. It is therefore typical that in the only case known (DE-A 34 10 930), in which a lambda control is proposed for a gas-operated motor, it is obviously a stationary motor with slow output variation that is involved, which allows slow adjustment excursions for an exact positioning of the metering valve under the effect of the lambda control (page 6, top), there being no direct actuation of the metering valve under the effect of a power requirement signal. Lambda is the ratio between the quantity (mass) of air avialable for combustion and the quantity of fuel. The stoichiometric relation is characterized by lambda=1.

The invention is therefore based on the object of providing an arrangement of the type mentioned at the start which allows a universal arrangement, in particular including under the conditions of short-term load change in vehicle engines, and in which the accuracy of the metering is not impaired by a shift in the characteristic curve of the metering valve.

The solution according to the invention consists in that the means of regulation, which is to be understood as meaning a lambda control in particular, acts on the setting of the reduction valve, and the chamber between the two valves is designed as buffer volume for the equalization of pressure fluctuations.

While the prior art generally concentrates accuracy requirements on the metering valve, whereas the reduction valve is conceded merely a serving function with lesser requirements, the invention attributes them admittedly a comparable influence on the metering accuracy, but a partially differing setting characteristic. This is that the metering valve retains the fast reactivity to changing power requirement signals due to the direct actuation, while the actuating pulses generated in the closed control loop, which concern in particular the setting of the air-fuel ratio on the basis of the signal of a lambda probe, are applied to the reduction valve. It is therefore not necessary to superpose the slower closed-loop control pulses on the fast-reaction open-loop control of the metering valve. What is achieved in this way is a metering system for motor vehicles which is on the one hand suitable for dealing with rapid load changes with high precision and fast reaction and on the other hand is capable of processing the pulses of a lambda control. This facilitated by the two valves being separated from each other by a buffer volume which allows equilization of the pressure fluctuations which otherwise may possibly occur due to the difference in the speed of reaction to different operating variables and would disturb metering in the short term.

This is not to be understood as meaning that the reduction valve should be adjusted exclusively under the influence of closed control loops. Rather, it may also be actuated by other operating variables, for example gas and air temperatures, power level and power change.

In those applications in which the metering valve does not have to respond to rapid load changes, such as is the case with stationary motors or metering devices for heating purposes, in the unit according to the invention, the second valve may be replaced by a valve of lesser qualification, because the accuracy of the metering is already ensured by the first valve due to the lambda control.

A secondary object of the invention is to provide for the application described a metering device which is versatile in the way it can be used. In this respect, the invention is based on such known metering devices (WO 82/02926, EP 155538), which comprise a multipart housing, a reduction valve with actuation mechanism, a metering valve, a chamber arranged in the flow path between the two valves and, if appropriate, systems for the supply of heat to the flow path of the gas.

The solution according to the invention consists in that a part of the chamber which is essential as buffer volume and/or for heat tramsmission is confined from a chamber housing part which is separate from the mechanics housing part accommodating the reduction valve and its actuation mechanism.

The separation of the two housing parts makes it possible to provide, with little outlay, units with different shapes and volumes of the chamber for different power requirements, because the mechanics housing part remains unchanged for all applications and only the less expensive chamber housing part is exchanged. This applies in particular whenever the machanics housing part accommodates not only the reduction valve and its actuation mechanism but also other parts associated with high-quality machining or fitting or operation, such as for example fuel feed connection, shut-off valve, idling nozzle, overrun cutoff valve, fuel discharge connection. The metering valve is in any case generally a separaate third component.

It is known from the prior art cited at the beginning to equip the metering device with a duct for receiving a liquid heat carrier (engine cooling water). In the device according to the invention, this duct is expediently provided in the mechanics housing part. In order that, nevertheless, the surface of the chamber housing part may also be used for heat transmission, one wall of the chamber housing part may be in thermally conductive connection with the heat carrier duct. Alternatively, the chamber housing part may also include a heat carrier duct.

According to a special feature of the invention, the chamber includes ribs for subdivision into a number of buffer spaces interconnected by openings of reduced size, or for enlargement of the heat exchange area. Equipping a chamber in a metering device with heat exchange ribs is known per se (WO 82/02926); however, in this citation the chamber adjoins the second valve, while in the case of the invention the heat transmission takes place in the chamber between the two valves, which is much more appropriate because otherwise there is the danger that the medium is fed to the metering valve in a partially still liquid state, or that one or the other valve ices up.

The voluminous design of the chamber reduces the danger of vibrations of the system, the subdivision into a number of buffer spaces interconnected by reduced cross-sections having an additional damping effect. In this case, not all buffer spaces have to be directly in the flow path of the gas. On the contrary, it may be advantageous if a proportion of gas of elevated temperature compared with the conducted gas stream is collected in a buffer space which is not in the flow path of the gas and which mixes in with the gas stream if there is a sudden opening of the metering valve due to the pressure drop and corresponding expansion, preventing a shock-like cooling of the same.

Use of the chamber as a buffer store requires a voluminous design. Voluminous in this context preferably means that the amount of the volume of the gas chamber in $cm^3$ is at least approximately half as great as the amount of the output of the connected combustion engine in kw. More preferably, these amounts are of the same order of magnitude.

The chamber may include a sensor for the temperature and/or the pressure of the gas. The pressure signal is used for influencing the reduction valve, as is known per se, while the temperature signal is used for influencing the heat supply and/or also for influencing the reduction valve.

Owing to the adaptability of the chamber volume to different power stages, the unit according to the invention can be used within a large output range. This is not restricted by the design of the mechanical part because, at high output levels, it can operate at correspondingly high pressure of the gas in the chamber ahead of the metering valve, while this pressure is correspondingly lower at small output stages. This setting of the unit to different output stages can take place for example by exchanging springs determining the reduction pressure or by adjusting their pretension. According to a special feature of the invention, a motor is provided for adjusting the characteristics of the reduction valve, which motor automatically performs the adaptation to the respective output stage under the effect of the control signals dependent on the operating data concerned. Preferably a control unit acting on the motor of the reduction valve is provided and is set up for processing the signals, in particular a lambda signal. It may be part of a central computer, which also generates the actuating signals for the metering valve.

The metering device according to the invention can be used not only in conjunction with liquid gas, but also with free-flowing fuels in general. However, the special temperature and pressure problems in the use of liquid gas make it appear particularly suitable for this field of application. It does not matter what type of engine follows downstream; however, spark ignition engines are preferably concerned. The device can also be used, however, for the metering of additional fuel in diesel engines for reducing the soot exhaust.

Known metering devices deliver the gas at negative pressure to a special mixing unit or to a gasifier provided for bivalent operation in the air line. This has the disadvantage that the suction line is filled with an ignitable mixture for a considerable portion upstream of the engine, so that instances of backfiring can cause considerable damage. The invention, on the other hand, allows delivery of the gas at constant positive pressure, so that it can be fed to the air stream at a position as close to the engine as desired and without the necessity of a mixing device.

The invention will be explained in more detail below with reference to the drawing, in which:

FIG. 2 shows a longitudinal section through the metering device.

Figure 1:
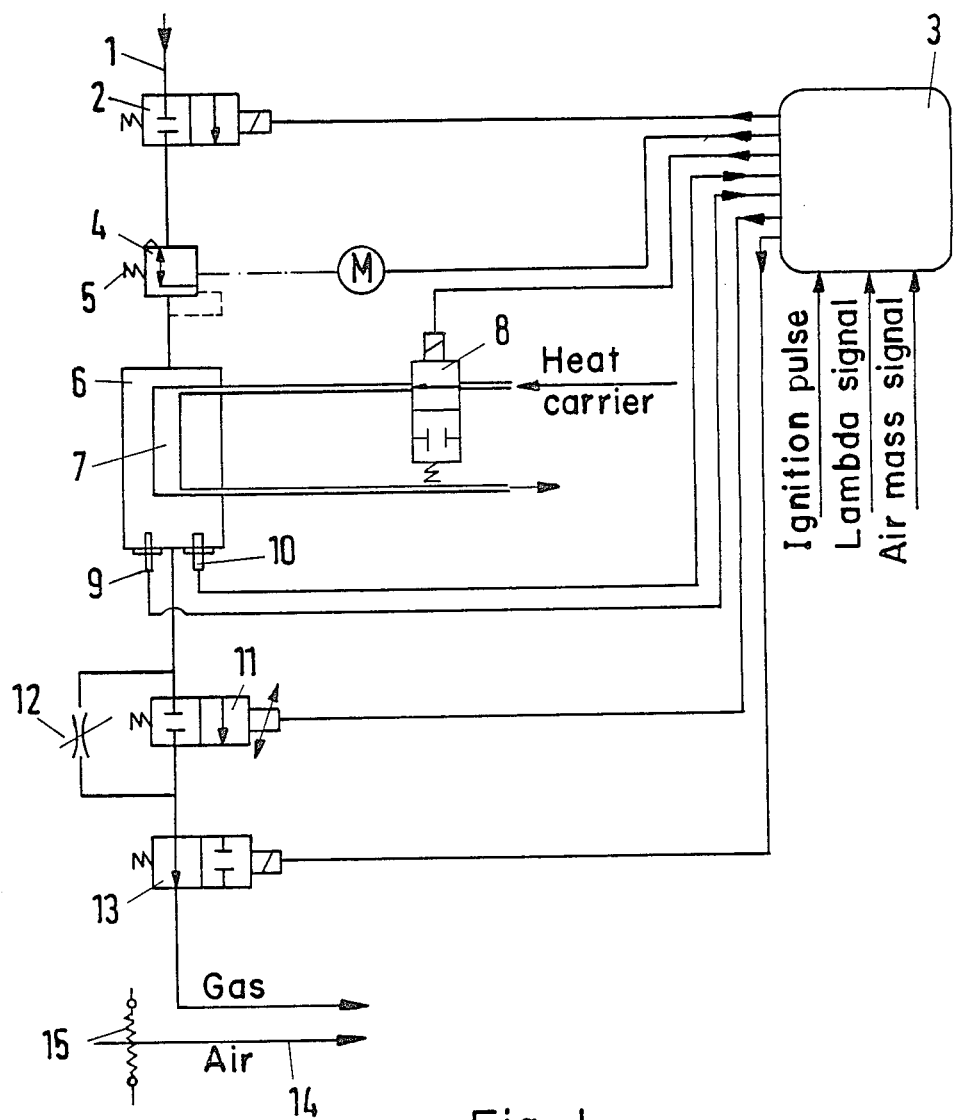
FIG. 1 shows a circuit diagram.

According to FIG. 1, the liquid gas coming from a source (not shown) is passed through the line 1 via an electromagnetic shut-off valve 2, which only receives an opening pulse from the computer 3 if ignition pulses or similar signals arrive there. This thus excludes any hazard from gas escaping from a stationary installation.

The reduction valve 4 reduces the gas pressure, which may initially be, for example, 6 to 9 bar, to the selected reduction pressure, which in general is between 0.2 and 0.8 bar, in special cases may be above or below these values. For continuous setting of the spring determining the reduction pressure, a servomotor M is provided, which receives its control pulses from the computer 3 as a function of certain operating variables, in particular the reduction pressure, the lambda signal, the gas temperature and/or a signal representing the respective power requirement.

There then follows the chamber 6, which on the one hand forms a buffer volume for the avoidance of pulsations and on the other hand includes heat exchange areas 7 for a heat carrier, for example cooling water, fed via a valve 8. Also arranged in it is a temperature sensor 9, which controls the valve 8 via the computer 3, and also the pressure sensor 10 mentioned above, which acts on the control of the servomotor M at the reduction valve 4.

This is followed by the metering valve 11, which is designed as an electromagnetic proportional valve controlled by the computer 3. A bypass 12 is provided for the idling setting. Finally, there may follow, if desired, and electromagnetically controlled valve 13 for overrun cutoff before the gas is mixed into the air stream 14, in which valve there is a hot wire instrument 15 or another measuring instrument for air mass determination, the signal of which is fed, like other possible influencing signals (for example the lambda signal), to the computer 3.

Different development stages of the device are characterized by the existence or non-existence of the servomotor M, the pressure and temperature sensors 9, 10, the hot wire instrument 15 and the overrun cutoff valve 13. The bypass 12 may be dispensed with if the metering valve 11 is for example actuated as a function of speed in idling.

A practical configuration of this diagram may advantageously take the form shown in FIG. 2.

The gas feed duct 16 adjoins the coupling 17, which is provided for connection to the liquid gas tank. It contains the solenoid valve 2, which for safety reasons does not open until the engine is running. The gas feed duct 16 ends at the plate valve 18, which is part of the reduction valve 4. This is a diaphragm valve, on the diaphragm 19 of which acts the pressure in the valve chamber 20 on the one hand and the spring 5 on the other hand. The latter is operationally adjustable by means of the servomotor M. The servomotor M may be replaced by a set screw if an adjustment during operation is not intended. The valve chamber 20 forms a part of the chamber mentioned above, the larger part 21 of which is connected to the valve chamber 20 via a bore hole 22. Both chambers are in thermally conductive connection with the heat exchanger 7, which has hot cooling water flowing through it. The cooling water flow through the heat exchanger is determined by the valve 8 (not appearing in this drawing), which receives its signals via the computer 3 from the thermometer 9 arranged in the chamber wall. Provided alongside the latter is the pressure sensor 10, the signals of which are passed via the computer 3 to the servomotor M. The second part 21 of the chamber includes ribs 23, which are in connection with the cooling water space and therefore likewise form heat exchanger areas. In addition—just like the bore hole 22—they subdivide within the gas chamber a number of compartments which are interconnected by reduced cross-sections and therefore counteract the formation of pulsations.

Those elements which require complex housing machining and shape are arranged in the housing part 29, which was referred to above as mechanics housing part. The larger part 21 of the chamber is in the chamber housing part 30, which is closed by the cover 28. The housing part 30 has a comparatively simple shape and can therefore be replaced at low outlay according to requirements by a larger or smaller housing part with more or less ribs or chamber compartments. The exposed cover 28 can also be easily modified or exchanged in the sense of a larger or smaller chamber volume without changing other parts alongside the chamber walls.

The main gas stream is then directed to the electromagnetic proportional valve 11, from which it passes via duct 24 to the outlet piece 25. The duct 26 denotes the bypass which is used for idling setting by means of set screw 27. Upstream of the outlet piece 25 is the overrun cutoff valve 13.

I claim:

1. An arrangement for the metering of fuel, in particular liquid gas, to a variable-output power apparatus comprising:

a metering device with a reduction valve (4), a metering valve (11), a chamber (20, 21) arranged therebetween, means for open-loop control of the metering valve as a function of a power requirement signal, means for closed-loop regulation of the reduction valve (4), wherein the chamber (20, 21) between the two valves is designed as a buffer volume for the equalization of pressure fluctuations, and the volume of the chamber in cubic centimeters is at least half as great as the output of the power apparatus in kilowatts.

2. A metering device for fuel, comprising:

a reduction valve adapted to receive fuel from a fuel supply;

means for adjustably actuating the reduction valve;

a metering valve located downstream of the reduction valve and controllable to meter fuel to a fuel consuming power apparatus;

a chamber fluidly connecting the reduction valve and the metering valve, the chamber comprising, a mechanics chamber part that contains the reduction valve, the means for actuating the reduction valve, and a first partial chamber volume, a housing chamber part containing a second partial chamber volume, the housing chamber part being selectively connectable to the mechanics chamber part and together therewith forming said chamber; and wherein the volume of the chamber in cubic centimeters is at least as half great as the rated output of the power apparatus in kilowatts.

3. The metering device as claimed in claim 2, wherein the mechanics housing part contains a duct for receiving a heat carrier.

4. The metering device as claimed in claim 3, wherein the chamber housing part includes a wall in thermally conductive connection with the heat carrier duct.

5. The metering device as claimed in claim 2, wherein the chamber includes ribs for subdivision into a number of interconnected buffer spaces for substantially equalizing the pressure between the reduction valve and the metering valve during transients.

6. The metering device as claimed in claim 5, wherein at least one of the buffer spaces is not in the flow path of the fuel.

7. The metering device as claimed in claim 2, wherein the volume of the chamber in cubic centimeters is at least as great as the output of the fuel consuming power apparatus in kilowatts.

8. The metering device as claimed in claim 2, wherein the chamber includes a sensor for at least one of temperature and pressure of the fuel, the signal of which is used for adjusting the reduction valve.

9. The metering device as claimed in claim 2, wherein a motor is provided for adjusting the characteristics of the reduction valve.

10. The metering device as claimed in claim 8, wherein the means for actuating the reduction valve is responsive to said sensor and a lambda signal.

11. The metering device of claim 2, wherein said housing chamber part includes baffle means in the second partial chamber for contacting fuel as it flows from the reduction valve to the metering valve.

12. The metering device of claim 2, wherein the device includes at least one additional component selected from the group consisting of a shut-off valve, fuel supply connection, idling nozzle, overrun cutoff valve, and fuel discharge connection and wherein at least said one additional component is contained in the mechanics housing part.

13. A flow line arrangement for metering fuel to a variable-output fuel consuming power apparatus, comprising:
   a reduction valve adapted to receive fuel from a fuel supply;
   a metering valve located downstream of the reduction valve and controllable to meter fuel to the power apparatus;
   means responsive to the power requirement of the power apparatus for controlling the metering valve;
   means responsive to the condition of at least one of the flow line and power apparatus for regulating the reduction valve; and
   means defining a chamber fluidly connecting the reduction valve and the metering valve, the chamber having a buffer volume sufficient for substantially equalizing the pressure between the reduction valve and the metering valve during transient conditions in the flow line wherein the volume of the chamber in cubic centimeters is at least half as great as the rated output of the power apparatus in kilowatts.

14. The flow line arrangement of claim 13 wherein the magnitude of the volume of the chamber in cubic centimeters is at least the magnitude of the rated output of the power apparatus in kilowatts.

15. The flow line arrangement of claim 13, further including means for sensing one of temperature and pressure of the fuel in the chamber, and wherein said means responsive to the condition of the flow line is responsive to said means for sensing.

16. The flow line arrangement of claim 13 wherein the means for regulating the reduction valve includes a motor.

17. The flow line arrangement of claim 16 wherein the motor is responsive to at least one of the conditions of pressure and temperature of the fuel in the flow line.

18. The flow line arrangement of claim 16 wherein the motor is responsive to the lambda ratio of the power apparatus.

19. The flow line arrangement of claim 13, wherein the means defining the chamber includes means for transferring heat into the chamber, and the means for regulating the reduction valve is responsive to the pressure and temperature of the fuel in the chamber and the lambda ratio of the power apparatus.

* * * * *